UNITED STATES PATENT OFFICE.

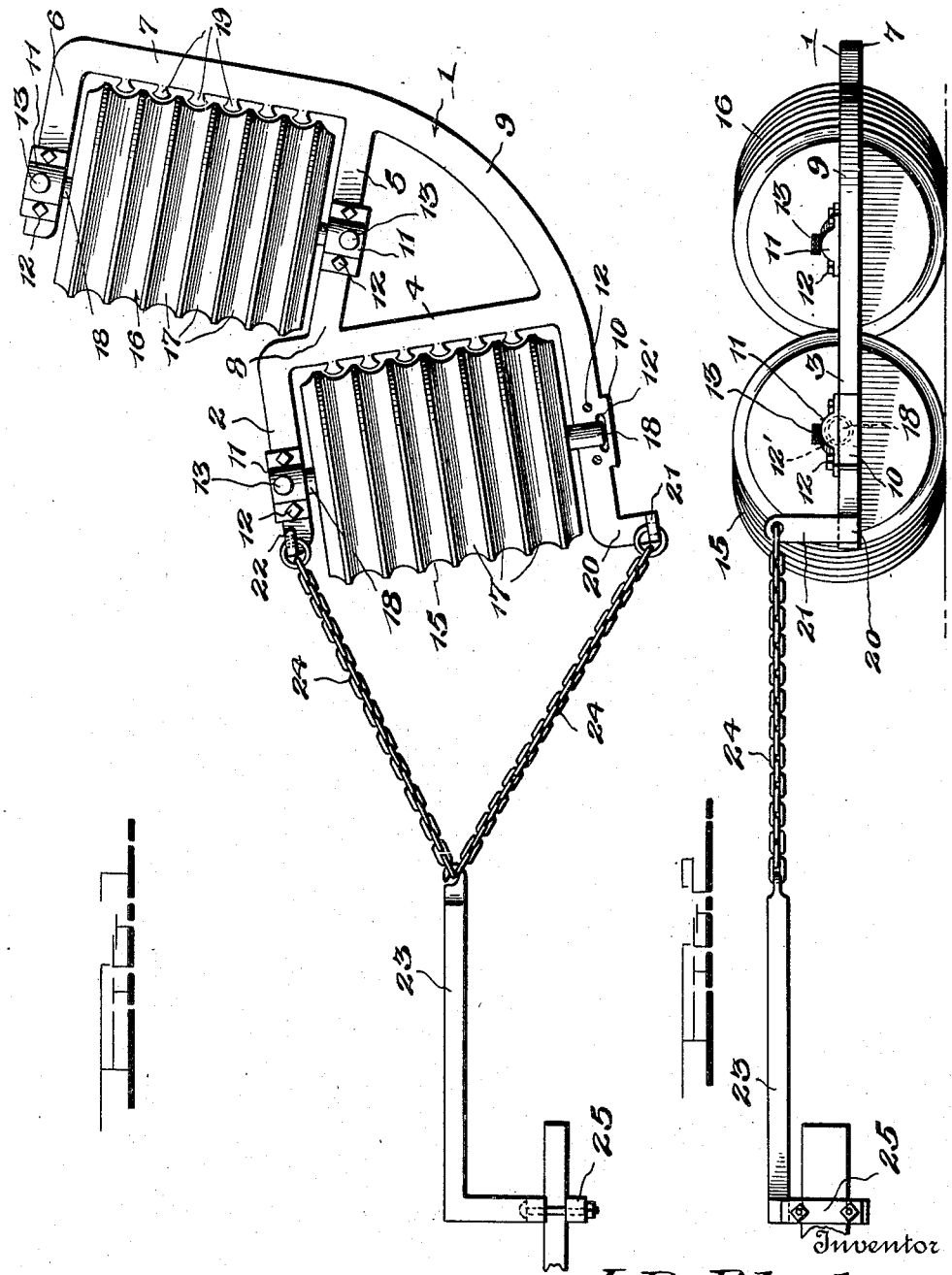

JOHN RANDALL BLACK, OF TOULON, ILLINOIS.

AGRICULTURAL IMPLEMENT.

1,189,783.　　　　Specification of Letters Patent.　　Patented July 4, 1916.

Application filed July 29, 1915. Serial No. 42,637.

*To all whom it may concern:*

Be it known that I, JOHN RANDALL BLACK, a citizen of the United States, residing at Toulon, in the county of Stark and State of Illinois, have invented certain new and useful Improvements in Agricultural Implements; and I do declare the following to be a full, clear, and exact description of the invention, such as will enable others skilled in the art to which it appertains to make and use the same.

This invention relates to new and useful improvements in agricultural implements and more particularly to the production of a machine which tends to produce in one operation the results secured from the applications of the disk or pulverizer, the roller or sub-sod roller, and the harrow or planker. Furthermore this machine will produce on the surface of the ground a mulched condition not brought about by the combined use of the last mentioned implements whereby the moisture in the earth is conserved.

A further object of the invention is to provide a device which is simple and durable in construction, inexpensive to manufacture and one which will be very efficient in operation.

With these and numerous other objects in view, the invention consists of certain novel features of construction, combination and arrangement of parts which will be herein referred to and more particularly pointed out in the specification and claims.

In the accompanying drawings: Figure 1 is a top plan view; and Fig. 2 is a side elevation.

In describing my invention I shall refer to the accompanying drawing in which similar reference characters designate corresponding parts throughout the several views and in which the numeral 1 indicates as an entirety my frame which consists of an open section herein shown substantially U-shaped having arms 2 and 3 and a base portion 4 and an additional open section also substantially U-shaped and having arms 5 and 6, and a base portion 7 and disposed in the rear of the said first mentioned section, and projecting at an angle therefrom. The extremity of the arm 5 of the last mentioned section is connected to the base 4 of the first mentioned section adjacent one end as shown at 8. An arcuate strip 9 connects the opposite ends of the arms 5 and the base 4 of the said sections. Thus it will be seen that I have provided a frame of a particular construction which involves therein, two substantially U-shaped sections disposed one in the rear of the other and having diverging axes, one end of the forward section being disposed adjacent the opposite end of the rear section. On the arms 2 and 3, and 5 and 6, of the said sections are formed the lower portions of bearings 10, which are positioned adjacent the extremities of the said arms as clearly shown in Figs. 1 and 2 of the drawings. These bearings 10 have upper sections or portions 11 which are adapted to be secured thereto by fastening means shown at 12, and an annular or cylindrical bearing surface is formed between the same. At the end of the said bearing surface formed thereby is a circular lubricating groove 12' formed by semi-circular lubricating grooves on the upper and lower portions of said bearings, which are connected with a lubricating source positioned above the bearing plate 11 designated by the numeral 13.

Adapted to be positioned in the substantially U-shaped sections are a pair of cylindrical rollers 15 and 16 which have their outer edges peripherally grooved as shown at 17. These rollers have projecting axles 18 which are adapted to be positioned between the bearings 10 and 11, so that the rollers will be revolubly mounted therebetween, with the inner ends of their axes arranged in advance of their outer ends, said axes diverging toward the front of the attachment, and these rollers will turn freely when the frame is moved over the ground and at the same time produce a scraping action exerted longitudinally of the rollers on the plowed ground over which the said rollers are drawn and thereby level the ground and at the same time force and pack into the grooves of the rollers the newly plowed moist earth from which grooves the earth is removed by cleaning elements to be described in the form of small particles which constitute a mulch for conserving the moisture in the plowed earth over which it is spread.

Projecting forwardly from the bases 4 and 7 of the U-shaped sections are a plurality of spaced projections or cleaning fingers 19 which have their outer surfaces curved to correspond to the curvature of the grooves 17 of the rollers 15 and 16, and are spaced a short distance therefrom whereby the said projections will remove all the soil that has been packed into the grooves of the said roller, whereby the mulch referred to is produced and the grooves of the rollers cleaned at each revolution thereof.

The outer extremity of the arm 3 of the forward U-shaped section is bent laterally as shown at 20 and has extending upwardly from the extremity thereof, an upright support 21 which has an apertured upper end. The opposite arm 2 of said roller section has formed on its extremity an upright support 22 also having an apertured upper end. These upright supports are secured to a right-angular bar 23 by means of a pair of chains 24 which connect said uprights with a hook of one end of the said bar. The other end of the bar 23 is connected as shown at 25 to the frame of a plow. Thus it will be seen that by attaching this frame to a plow by the above described means, these two grooved rollers will be drawn over the surface of the ground behind the plow while the ground is still damp, and the scraping action produced by the rollers will level the ground and pack the grooves of the rollers with earth and this earth will be ejected from said grooves by the fingers or cleaners 19 and will mulch the surface of the ground in such a manner as to conserve the moisture therein. In this manner the moisture is saved which would otherwise be wasted between plowing and disking, again between disking and harrowing, and again between harrowing and planking or rolling. Moreover by having the axes of the rollers diverging forwardly the machine will turn on its swivel with a much shorter hitch than would be possible if the divergence were the other way.

This machine may be attached to any of the ordinary forms of plows, and it will be noted that its extreme simplicity of structure does away with the necessity of using any levers in applying the same to the ground.

The particular position of the rollers used in this device renders this agricultural implement very efficient in attaining the results set forth.

From the foregoing description of the construction of my improved agricultural implement, the manner of applying the same to use and the operation thereof will be readily understood, and it will be seen that I have provided a simple, inexpensive and efficient means for carrying out the objects of the invention.

I claim:—

1. A combined leveling and mulching attachment for plows including a supporting frame, a plurality of peripherally grooved rollers revolubly mounted therein with the axes of said rollers diverging toward the front and the inner ends of said rollers disposed in advance of their outer ends whereby the horizontal forward dragging of the attachment will cause the rollers to exert an endwise scraping action thereby leveling the ground over which they are drawn and simultaneously packing the moist earth in the grooves thereof, and cleaning fingers extending into said grooves for removing the packed earth therefrom and permitting it to drop on the ground over which the attachment is drawn to form a moisture conserving mulch.

2. A device of the character described including a frame comprising a substantially U-shaped section, an additional substantially U-shaped section disposed in the rear of said first mentioned section and projecting at an angle therefrom, the extremity of one arm of the last mentioned section connected to the base of the first mentioned section adjacent one end, an arcuate strip connecting the opposite ends of said base and arm, and a pair of peripherally grooved rollers disposed in said sections.

3. A device of the character described including a frame, comprising a pair of substantially U-shaped sections disposed one in the rear of the other and diverging from each other, one end of the forward section disposed adjacent the opposite end of the rear section, bearings on the opposite arms of said sections, and a pair of peripherally grooved rollers disposed in said bearings.

4. A combined leveling and mulching attachment for plows including a rigid frame comprising two open sections disposed one in the rear of the other and diverging from each other, one end of the forward section being disposed adjacent the opposite end of the rear section, longitudinally alined bearings carried by the opposite ends of the sections, the axes of the bearings of the two sections diverging toward the front, the inner bearings of the two sections being arranged in advance of the outer bearings thereof, and peripherally grooved rollers having axles at their ends revolubly mounted in the bearings of the sections.

5. A device of the character described including a frame, comprising a pair of substantially U-shaped sections disposed one in the rear of the other and diverging from each other, one end of the forward section disposed adjacent the forward end of the rear section, upper and lower bearing surfaces on the arms of said sections adjacent the ends thereof, a semi-circular lubricating groove on the inner end of said surfaces, a pair of peripherally grooved rollers in said sections having projecting axes positioned between said bearing plates, means carried by said sections to remove soil from the grooves in said rollers when revolving, a lateral projection on the end of one of the arms of the said forward section, the extremities of the arms of said sections being bent vertically upright, and chains connecting the said uprights to a rod secured to the motive power.

In testimony whereof I have hereunto set my hand in presence of two subscribing witnesses.

JOHN RANDALL BLACK.

Witnesses:
THOMAS A. BLACKBURN,
ANNIE INGOLDSBY.

Copies of this patent may be obtained for five cents each, by addressing the "Commissioner of Patents, Washington, D. C."